Oct. 12, 1965 E. H. C. BROWN 3,211,622
SERVOMECHANICAL FLUID CHARGING AND VOLUME CONTROL
SYSTEM FOR A NUCLEAR REACTOR
Filed March 5, 1963 2 Sheets-Sheet 1

WITNESSES:
Bernard R. Giguere
Edward F. Possessky

INVENTOR
Eugene H.C. Brown
BY D. Smith
ATTORNEY

United States Patent Office 3,211,622
Patented Oct. 12, 1965

3,211,622
SERVOMECHANICAL FLUID CHARGING AND VOLUME CONTROL SYSTEM FOR A NUCLEAR REACTOR
Eugene H. C. Brown, Venetia, Pa., assignor to Westinghouse Electric Corporation, Pittsburgh, Pa., a corporation of Pennsylvania
Filed Mar. 5, 1963, Ser. No. 262,955
13 Claims. (Cl. 176—20)

The present invention relates to fluid charging and volume control systems for nuclear reactors and more particularly to such systems wherein fluid charging flow and fluid volume are controlled automatically.

Heat energy in a nuclear reactor is generated by means of a chain nuclear recation according to theory now widely published and well known. The generated heat energy is normally transfered to a pressurized fluid coolant which flows through the reactor fuel core and subsequently releases such energy for transformation into some form of work product. Such energy transformation is one of the primary objects of power nuclear reactors and ordinarily is accomplished by means of fluid or steam driven turbine-generator arrangements.

The reactor fluid coolant can also have neutron moderating properties, as is true for example where the pressurized fluid is water or heavy water, and as such can contribute to control of the nuclear reaction and heat generating rate. Particularly in power reactors where load demand can be cyclic or step-like in variant character over a period of time, the reactor fluid coolant can undergo relatively wide fluctuations in pressure and temperature (with negative or opposite variations in nuclear reaction rate if the fluid coolant has neutron moderating properties) in response to such load swings unless restrictive control is placed on these coolant parameters. The reactor coolant fluid also undergoes expansion or contraction due to temperature increase or decrease during reactor start-up and during ractor shut-down respectively as coolant parameter control is needed under these conditions as well.

Maintenance of coolant pressure within a given range is usually accomplished by means of a pressurizer tank connected to the main reactor coolant system. Heating coils in the tank provide local heat for controlling the vapor pressure above the liquid level in the tank, and an overhead spray arrangement in the tank provides for vapor condensation when required. If coolant pressure is too great, some of the vapor can be condensed to reduce temperature and pressure in the pressurizer; and, in the case of coolant pressure which is too low, locally generated heat can increase temperature and pressure in the pressurizer.

There are limitations, however, as to the scope of pressure variations which can be handled by a pressurizer since some pressure swings, due say to large load swings, may lower the coolant level below the heating coils to render further vaporization control difficult or unobtainable or, on the other hand, may raise the coolant level to a height which is unsafe in relation to the steam volume of the pressurizer since at such height pressure control is effectively lost or substantially diminished. In addition, of course, maintenance of coolant level in the pressurizer does depend on whether there exists any coolant loss elsewhere in the flow system.

In any event, there has been and continues to be a need for total coolant volume control in addition to the control of pressure in the manner just outlined. One of the principal purposes of coolant volume control is to provide coolant level control in the pressurizer so that the latter device can provide corrective pressure action over a wider range of steady-state and transient pressure conditions than would otherwise be the case. A volume control system incorporated in the reactor coolant flow system thus can provide "make-up" or "charge" fluid to cover fluid losses, and additionally can provide for "let down" flow from the main coolant line to cover fluid expansion or purification needs.

Nonetheless, manual control of make-up and let-down flow in volume control systems can be and normally is problematical (although not necessarily unsafe since other safety systems can become operative in the event of volume error) since the institution of changes in such flows can be mistimed or made when unnecessary, or even omitted when necessary. Further, manually instituted and excessive step changes in such flows in order to obtain corrective volume action or in order to increase the rate of purification, if a purification system is interconnected with the volume control system, can lead to "flashing" in the let-down flow path or damaging thermal shock to the coolant line at the point of make-up injection. It is thus advantageous in many respects to provide a volume and charging control system with servomechanical or automatic control which initiates corrective action in the appropriate circumstances of time and system parameters and only to the extent necessary.

Thus, in accordance with the principles of the present invention, reactor main coolant system volume or pressurizer coolant level is maintained substantially constant by means of a servomechanical volume and charing control system which comprises a let-down flow path connected to the main coolant system and a make-up flow path connected to the main coolant system. The let-down path is connected to the make-up path preferably through a low pressure surge tank, and a regenerative heat exchanger can be connected in the paths so as to cool the let-down flow by transferring heat therefrom to the make-up flow. Further, a purification flow arrangement can be interconnected with the volume and charging control system so as to provide for waste removal from the coolant at a desired rate with little or no interference with the principal function of coolant volume maintenance. One or more throttling valves and one or more fixed speed or variable speed pumps are respectively included in the let-down path and the make-up path for controlling the respective flows therethrough.

Circuit means compare input signals derived from various response means and respectively representing pressurizer coolant level or the time integral of pressurizer coolant level or both of these factors, let-down flow rate and make-up flow rate, and, if volume error exists, generates an error signal as a servomechanical output condition so as to initiate valve or pump action leading to or maintaining substantial constancy in the pressurizer coolant level and the total main coolant system volume. Preferably this control action is "averaging" in nature in the sense that it be effective only over relatively long term transient volume variations, but nevertheless is also preferably effective over shorter term transient volume variations if such variations are relatively excessive in amplitude.

Therefore, it is an object of the invention to provide a novel volume and charging control system for a nuclear reactor.

It is another object of the invention to provide a system as set forth in the first object wherein a servomechanical arrangement is included therein for automatically maintaining substantial constancy in the total volume of main coolant system or in the pressurizer fluid level.

A further object of the invention is to provide a system as set forth in the second object wherein the servomechanical arrangement includes one or more let-down throttling valves and one or more fixed or variable speed make-up pumps and further includes circuit means for comparing input flow, let-down flow, and pressurizer fluid level signals and for providing an error signal which activates the valves or the pumps so as to obtain volume constancy.

An additional object of the invention is to provide a system as set forth in the preceding object wherein the average fluid volume or pressurizer fluid level is maintained constant over a period of time and wherein this result is effected through the cooperative employment of a response device delivering a signal, which is dependent on a time integral of the pressurizer fluid level, to the input of the comparator circuit means.

It is another object of the invention to provide a system as set forth in the second object wherein a purification system is connected to the system and the volume control action is such as to be substantially non-interfering with the rate at which it is desired to run the purification process.

These and other objects of the invention will become more apparent upon consideration of the following detailed description along with the attached drawings, in which.

Figure 1:
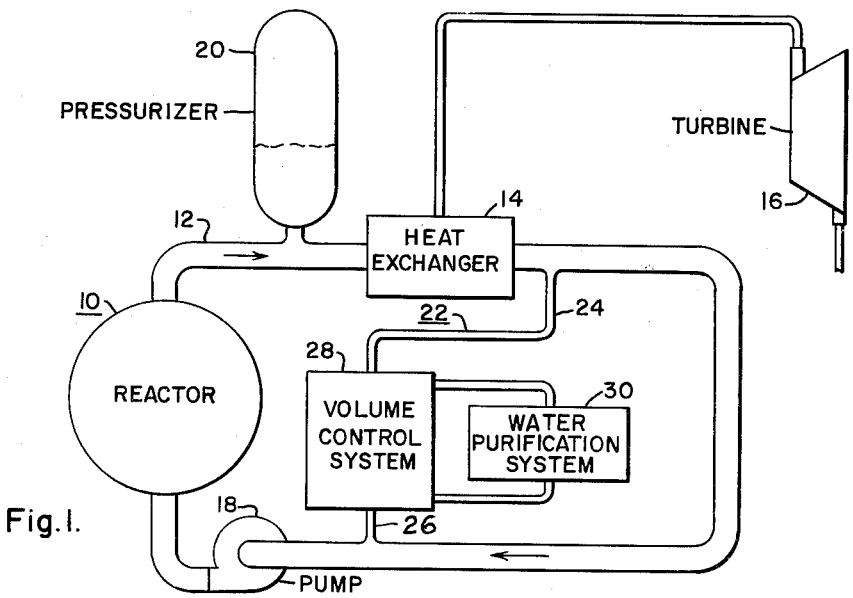
FIGURE 1 is a schematic view of a reactor system including a servomechanical volume and charging control system constructed in accordance with the principles of the invention.

There is shown in FIG. 1 a nuclear power reactor 10 of suitable construction and main coolant lines 12 therefor. In this instance, pressurized water is circulated through the coolant lines 12 and the reactor 10 for the purpose of transferring heat energy from the latter device to heat exchangers 14 which in turn produces steam for driving a turbine generator arrangement 16. If desired, positive pumping action can be provided for the purpose of maintaining coolant circulation in the lines 12 through the use of one or more pumps 18.

A pressurizer 20, having a casing of stainless steel or the like for containment strength, is connected to a main coolant line 12 for the purpose of controlling the coolant pressure in a manner similar to that previously described. In order to control the fluid level in the pressurizer 20, a bleed or shunt line 22, including a let-down or withdrawal portion or path 24 and a make-up or charging portion or path 26, provides limited flow through a servomechanical volume and charging control system 28 and in this instance a water purification system 30.

Figure 2:
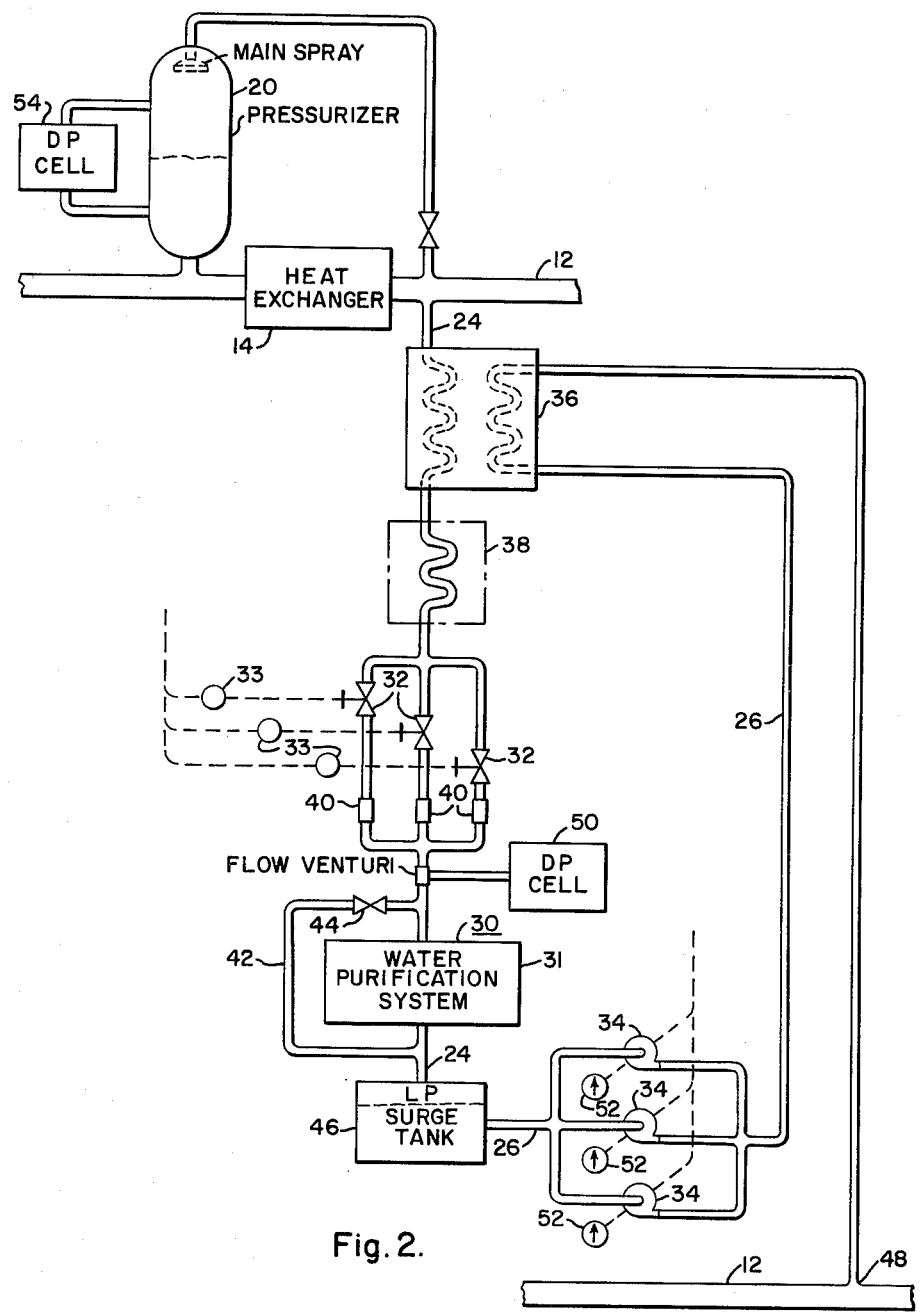
FIG. 2 is a schematic view of a portion of the reactor system of FIG. 1 showing the servomechanical volume and charging control system in greater detail.

As more specifically shown in FIG. 2, the servomechanical volume and charging control system 28 includes one or more variably positionable throttling valves 32 for the purpose of controlling the rate of let-down coolant flow and one or more fixed or variable speed pumps 34 for the purpose of controlling the rate of make-up coolant flow. The difference between the rate of make-up flow and the rate of let-down flow is determinative of whether coolant is being added to or extracted from the main coolant system; and, accordingly, it is preferred that the let-down flow controlling valves 32 and the make-up flow controlling pumps 34 be automatically controllable. However, one or more of all of these elements can be manually controllable so long as at least one of the pumps and one of the valve elements is automatically controllable and variable in speed or position for the purpose of obtaining good response in the volume and charging control action.

On this basis, the throttling valves 32 can be provided in the form of commercially available air control throttling valves and the pumps 34 can be provided in the form of commercially available fixed or variable speed positive displacement pumps. It is to be understood, of course, that the flow capacity of the valves 32 and the pumps 34 will be dependent upon overall flow design specifications. Accordingly, position setting of the let-down valves 32 can be accomplished by suitable control means, such as a suitable commercially available pneumatic servo converter 33; and speed control of the make-up pumps 34 can be accomplished by suitable control means, such as a field strength controlling device (not shown) associated with a D.C. drive motor (not shown) coupled with each pump 34.

Ordinarily, it is necessary to cool the let-down fluid or water especially if it is to be purified, as by passage through the purification system 30; and further it is ordinarily necessary to reheat the make-up fluid prior to its being charged into the main coolant system. Thus, if the let-down fluid is not sufficiently cooled, it can "flash" and cause undesirable pressure surges in the volume and charging control system 28 or the purification system 30. Similarly, if the make-up fluid is not reheated prior to its reentry into the main coolant line 12, it can cause thermal "shock" as it comes in contact with the high temperature main coolant flow line and thereby cause a rupture or other damage at the point where the make-up fluid is charged into the main coolant system.

For this reason, a regenerative heat exchanger 36 is included in the let-down and make-up flow paths 24 and 26 so that the let-down flow is cooled by the make-up flow and, conversely, so that the make-up flow is heated by the let-down flow. Further reducton in the temperature of the let-down flow can be accomplished through the use of a non-regenerative heat exchanger 38 down stream from the regenerative heat exchanger 36.

In any event, the heat exchangers 36 and 38 place some limitation upon the differential flow which can be established between the make-up and let-down flows for the purpose of obtaining volume control since a differential so great as to be outside the transfer capacity of the exchangers 36 and 38 could lead to the flashing or thermal shock problems already discussed. In order to obtain reasonable heat exchanger design cost, it is preferred that the differential in make-up and let-down flows be limited to say plus or minus 15% to 17%, but higher differential flow can be accommodated by suitable higher cost heat exchanger design. In this example, it is also desirable that the flow differential just considered be sufficient to accommodate the expansion rate of the main coolant during reactor start-up and the contraction rate of the main coolant during reactor shut-down. The suggested maximum flow differential of plus or minus 15% to 17% would normally be sufficient to provide this accommodation.

Once the let-down flow has passed through the let-down valves 32, it can be directed through respective let-down orifices 40 which provide for pressure reduction of the let-down flow to reduce the duty on the let-down valves. A bypass line 42 can be provided around the purification system 30 with a valve 44 included therein and suitably controlled for the purpose of directing let-down flow through the bypass line 42 instead of the purification system 30 if the let-down flow temperature rises above respective purification system limits.

Let-down flow emanating from the purification system 30 or the bypass line 42 is discharged into a low pressure surge tank 46 which is for example of cylindrical stainless steel construction. The low pressure tank 46 serves primarily as a container for make-up fluid flow and provides a pressure head for the make-up pumps 34 in the make-up flow process. However, other functions can be accomplished in the tank 46, for example it can serve as a region in which gaseous hydrogen is introduced into the coolant or water for the purpose of pH control of the reactor coolant.

The make-up flow line 26 is directed from the low pressure tank 46 to the pump or pumps 34 and then through the regenerative heat exchanger 36 to the main coolant system at a point indicated by the reference character 48. As already discussed, thermal shock at the point 48 is avoided because of the reheating provided for the make-up fluid or water by the regenerative heat exchanger 36.

The purification system 30 can comprise a container 31 and a bed therein of resinous material (such as strongly basic, quaternary ammonium anion resin and strongly acidic, sulfonic cation resin) through which the let-down flow is directed. In this manner, waste radioactive products accumulated in the coolant from the nuclear reactor 10 can be removed; and other processing functions can also be provided, such as the removal of neutron poisoning borates during and after the reactor start-up period if such borates are included in the coolant for the purpose of providing start-up reactivity control.

Flow measurement in the let-down flow path 24 and the make-up flow path 26 can be accomplished by suitable flow detection or response means. In this case, a differential pressure cell 50, across an orifice or flow venturi, such as a commercially available bellows actuated electromagnetic flow measuring device, is included in the let-down flow path 24 down stream of the orifices 40 for the purpose of providing an electrical signal representative of the let-down flow rate. The make-up flow rate, on the other hand, can more conveniently be determined in this example through the employment of respective tachometers 52 which are mechanically connected to the drive shafts of the pumps 34 and which provide an eletrical signal representative of the make-up flow rate. The fluid level in the pressurizer 20 is determined by another differential pressure cell 54 which also can be a commercially available bellows actuated electromagnetic device. The differential pressure cell 54 provides an electrical signal representative of the pressurizer fluid level, and this signal can be transmitted to a commercially available two-mode controller 55 (FIG. 4) for the purpose of generating a summation signal (weighted in sum as desired) representative of the pressurizer fluid level and the time integral thereof. As the summation signal is adjusted to become more dependent on the time integral quantity, the control action acquires more time averaging character.

Figure 3:
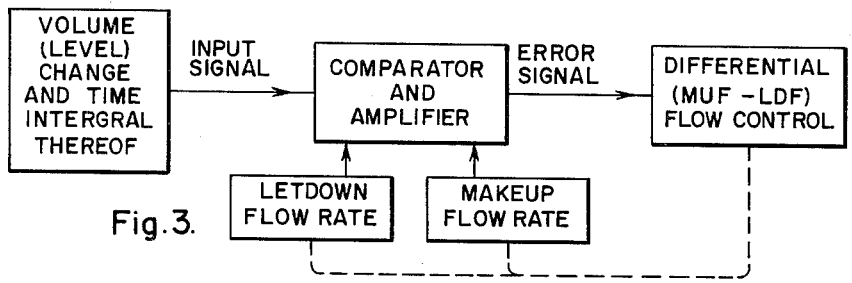
FIG. 3 shows a block diagram of the servomechanical volume and charging control system of FIG. 2.

The servomechanical nature of the operation of the volume and charging control system 28 can be more readily understood by reference to the block diagram shown in FIG. 3. Thus, it is noted that input signals respectively representing the let-down and make-up flow rates and the pressurizer level and time integral thereof are delivered to a comparator and amplifier which produces an error signal if the desired output condition of constant volume or constant average volume is not being met. The error signal is delivered to the drive control means of the make-up pumps 34 or let-down valves 32 or any combination of the pumps 34 and valves 32 so as to drive one or more of these elements in effecting the desired output condition which eventually requires equality of any persistent rate of coolant volume change with the difference between the make-up flow rate and the let-down flow rate. In illustration of this operation, consider the case where reactor coolant begins to be lost through leaks or the like at a given rate. The coolant volume rate of change is then a constant and upon control correction the let-down valves 32 and the make-up pumps 34 are set by the driving control means therefor so as to make the difference between the make-up flow rate and the let-down flow rate equal to the rate of coolant loss or the rate of coolant volume change.

If the coolant volume change rate is due to other circumstances such as a long term main coolant temperature change, the differential make-up and let-down flow rate adjusts essentially to meet or equal the coolant volume change rate. If the transient term of the coolant volume variation is so short as to be neglectable, the time response of the servomechanical operation can be adjusted (by means of the two-mode controller 55 for example) to prevent corrective action.

Figure 4:
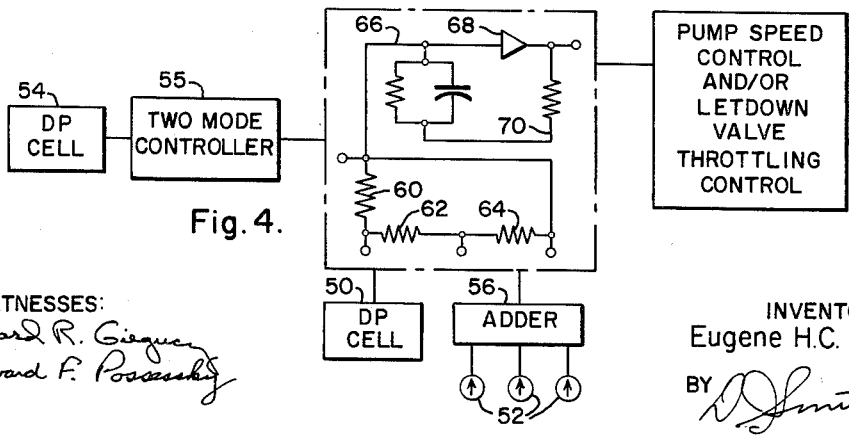
FIG. 4 shows in greater circuit detail a control portion of the servomechanical system of the invention.

As shown in FIG. 4, the coolant average volume signal is obtained from the differential pressure cell 54 and generated by the two-mode controller 55 and the let-down and make-up flow rate signals are obtained respectively from the differential pressure cell 50 and the tachometer or tachometers 52. Suitable adder circuitry 56 can be provided for the tachometers 52 for the purpose of producing a single make-up flow rate signal. The comparator and amplifier comprises circuit means which provides no output error signal if the output condition of constant fluid volume or maintenance of set pressurizer fluid level is met. However, an amplified error signal is generated if the difference between the make-up flow rate and the let-down flow rate is insufficient to offset a "long term" or substantial coolant volume change or volume change rate.

Thus, the comparator and amplifier circuit means comprise suitable circuitry to accomplish these functions and in this instance such circuitry comprises input resistors 60, 62 and 64 across which the volume or pressurizer level, let-down flow and make-up flow signals are respectively applied, and the net signal (MUFS-LDFS-Volume Signal) is delivered through circuit path 66 to amplifier 68 which has gain and stability controlling negative feedback path 70. The amplifier 68 thus generates an amplified output error signal in conformity with the net signal for controlling the speed of the pumps 34 or the position of the let-down valves 32. Correction in the flow rates is thereby obtained so as to provide the set output condition, namely retention of the desired level or average level of fluid in the pressurizer 20 or the desired coolant volume or average volume in the main coolant system.

The foregoing description has been presented only to illustrate the principles of the invention. Accordingly, it is desired that the invention not be limited by the embodiments described, but, rather, that it be accorded an interpretation consistent with the scope and spirit of its broad principles.

What is claimed is:

1. A coolant volume and charging control system for a nuclear reactor having a main fluid coolant line and a pressurizer connected thereto, said system comprising a let-down flow path and a make-up flow path connected together through a low pressure tank and bridging said main coolant line, means for controlling the rate of fluid flow in each of said paths, a fluid level within said pressurizer, means for detecting the rate of flow in each of said paths and the level of fluid in said pressurizer, an input signal produced by each of said detecting means and comparator means generating an error signal in response to said input signals from said detecting means for delivery to said controlling means so as to maintain the fluid level in said pressurizer substantially constant.

2. A coolant volume and charging control system for a nuclear reactor having a main fluid coolant line and a pressurizer connected thereto, said system comprising a let-down flow path and a make-up flow path connected together through a low-pressure tank and bridging said main coolant line, means for controlling the rate of fluid flow in each of said paths, a fluid level within said pressurizer, means for detecting the rate of flow in each of said paths and the level of fluid in said pressurizer, an input signal produced by each of said detecting means associated with said paths, a two-mode controller connected to the detecting means associated with the pressurizer so as to produce a signal for an average fluid level representing the sum of the change in pressurizer fluid level from a given set level and the time integral of such level change, and comparator means generating an error signal in response to said input signals from said two-mode controller and from said detecting means associated with said paths for delivery to said controlling means so as to maintain the average fluid level in said pressurizer substantially constant.

3. A coolant volume and charging control system for a nuclear reactor having a main fluid coolant line and a pressurizer connected thereto, said system comprising a let-down flow path and a make-up flow path connected together through a low pressure tank and bridging said main coolant line, at least one variably positionable valve device connected in said let-down flow path and at least one variable speed pump device connected in said make-up flow path so as to control the rate of fluid flow in said paths, a fluid level within said pressurizer, means for detecting the rate of flow in each of said paths and the level of fluid in said pressurizer, an input signal produced by each of said detecting means associated with said paths, a two-mode controller connected to the detecting means associated with the pressurizer so as to produce a signal for an average fluid level representing the sum of the change in pressurizer fluid level from a given set level and the time integral of such level change, and comparator means generating an error signal in response to said input signals from said two-mode controller and from said detecting means associated with said paths for delivery to at least one of said devices so as to maintain the average fluid level in said pressurizer substantially constant.

4. A coolant volume and charging control system for a nuclear reactor having a main fluid coolant line and a pressurizer connected thereto, said system comprising a let-down flow path and a make-up flow path connected together through a low pressure tank and bridging said main coolant line, a plurality of valve devices of which at least one is variably positionable connected in said let-down flow path and a plurality of pump devices of which at least one is provided with variable speed control connected in said make-up flow path so as to control the rate of fluid flow in said paths, a fluid level within said pressurizer means for detecting the rate of flow in each of said paths and the level of fluid in said pressurizer, an input signal produced by each of said detecting means associated with said paths, a two-mode controller connected to the detecting means associated with the pressurizer so as to produce a signal for an average fluid level representing the sum of the change in pressurizer fluid level from a given set level and the time integral of such level change, and comparator means generating an error signal in response to said input signals from said two-mode controller and from said detecting means associated with said paths for delivery to at least one of said variable pump and valve devices so as to maintain the average fluid level in said pressurizer substantially constant.

5. A coolant volume and charging control system for a nuclear reactor having a main fluid coolant line and a pressurizer connected thereto, said system comprising a let-down flow path and a make-up flow path connected together through a low pressure tank and bridging said main coolant line, means for controlling the rate of fluid flow in each of said paths, a fluid level within said pressurizer, means for detecting the rate of flow in each of said paths and the level of fluid in said pressurizer, an input signal produced by each of said detecting means, comparator means generating an error signal in response to said input signals from said detecting means for delivery to said controlling means so as to maintain the fluid level in said pressurizer substantially constant, and means for cooling and depressurizing the let-down coolant flow and for reheating the make-up coolant flow prior to injection of the latter into the main coolant line.

6. A coolant volume and charging control system for a nuclear reactor having a main fluid coolant line and a pressurizer connected thereto, said system comprising a let-down flow path and a make-up flow path connected together through a low pressure tank and bridging said main coolant line, means for controlling the rate of fluid flow in each of said paths, a fluid level maintainable within said pressurizer, means for detecting the rate of flow in each of said paths and the level of fluid in said pressurizer, means for producing an input signal from each of said detecting means, comparator means generating an error signal in response to said input signals from said detecting means for delivery to said controlling means so as to maintain the fluid level in said pressurizer substantially constant, means for cooling and depressurizing the let-down coolant flow and for reheating the make-up coolant flow prior to injection of the latter into the main coolant line, and a coolant purification arrangement connected in one of said paths.

7. A coolant volume and charging control system for a nuclear reactor having a main fluid coolant line and a pressurizer connected thereto, said system comprising a let-down flow path and a make-up flow path connected together through a low pressure tank and bridging said main coolant line, a plurality of valve devices of which at least one is variably positionable connected in said let-down flow path and a plurality of pump devices of which at least one is provided with variable speed control connected in said make-up flow path so as to control the rate of fluid flow in said paths, a fluid level within said pressurizer, means for detecting the rate of flow in each of said paths and the level of fluid in said pressurizer, an input signal produced by each of said detecting means associated with said paths, a two-mode controller connected to the detecting means associated with the pressurizer so as to produce a signal for an average fluid level representing the sum of the change in pressurizer fluid level from a given set level and the time integral of such level change, a coolant purification arrangement connected between said let-down flow path and said low pressure tank, and comparator means generating an error signal in response to said input signals from said two-mode controller and from said detecting means in said let-down and make-up paths for delivery to at least one of said variable pump and valve devices so as to maintain the average fluid level in said pressurizer substantially constant and so as to allow the rate at which coolant purification is provided to be varied without material effect upon the pressurizer fluid level.

8. A coolant volume and charging control system for a nuclear reactor as set forth in claim 4 wherein the detecting means associated with the make-up flow path are tachometers connected to said pump devices.

9. A coolant volume and charging control system for a nuclear reactor as set forth in claim 4 wherein said detecting means associated with said let-down flow path is at least one differential pressure cell.

10. A coolant volume and charging control system for a nuclear reactor as set forth in claim 4 wherein said detecting means associated with said pressurizer is a differential pressure cell.

11. A coolant volume and charging control system for a nuclear reactor system having a main fluid coolant line and a pressurizer connected thereto, said control system comprising a let-down flow path and a make-up flow path connected together and bridging said main coolant line, means for controlling the rate of fluid flow in each of said paths, a fluid maintainable at a predetermined level within said pressurizer, means for detecting the rate of flow in at least one of said paths and the level of fluid in said pressurizer, an input signal produced by each of said detecting means, and comparator means generating an error signal in response to said input signals from said detecting means for delivery to said controlling means so as to maintain the fluid level in said pressurizer substantially constant.

12. A coolant volume and charging control system for a nuclear reactor having a main fluid coolant line and a pressurizer connected thereto, said system comprising a let-down flow path and a make-up flow path connected together and bridging said main coolant line, a fluid level within said pressurizer, means for controlling the rate of fluid flow in at least one of said paths, means for detecting the rate of flow in at least one of said paths and the level of fluid in said pressurizer, an input signal produced by each of said detecting means, and comparator means generating an error signal in response to said input signals from said detecting means for delivery to said controlling means so as to maintain the fluid level in said pressurizer substantially constant.

13. A coolant volume control system for a nuclear reactor system having a main fluid coolant line and a predetermined volume of fluid within said reactor system, said control system comprising a let-down flow path and a make-up flow path connected together and bridging said main coolant line, means for controlling the rate of fluid flow in at least one of said paths, means for detecting the rate of flow in at least one of said paths and the volume of fluid in said reactor system, an input signal produced by each of said detecting means, and comparator means generating an error signal in response to said input signals from said detecting means for delivery to said controlling means so as to maintain the fluid volume in said reactor system substantially constant.

References Cited by the Examiner

UNITED STATES PATENTS 2,770,590 11/56 Serduke _____ 137—209 X
2,956,553 10/60 Bell _____ 137—209

CARL D. QUARFORTH, *Primary Examiner.*

REUBEN EPSTEIN, *Examiner.*